US009632932B1

(12) United States Patent
Sutardja et al.

(10) Patent No.: US 9,632,932 B1
(45) Date of Patent: Apr. 25, 2017

(54) BACKUP-POWER-FREE CACHE MEMORY SYSTEM

(71) Applicant: Marvell International Ltd., Hamilton (BM)

(72) Inventors: Pantas Sutardja, Los Gatos, CA (US); Abhijeet P. Gole, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 358 days.

(21) Appl. No.: 14/310,735

(22) Filed: Jun. 20, 2014

Related U.S. Application Data

(60) Provisional application No. 61/838,018, filed on Jun. 21, 2013.

(51) Int. Cl.
*G06F 12/00* (2006.01)
*G06F 12/0806* (2016.01)
*G06F 3/06* (2006.01)
*G06F 12/02* (2006.01)

(52) U.S. Cl.
CPC ........ *G06F 12/0806* (2013.01); *G06F 3/0619* (2013.01); *G06F 12/0246* (2013.01); *G06F 2212/222* (2013.01)

(58) Field of Classification Search
CPC ............................ G06F 12/0246; G06F 3/0619
USPC .......................................................... 711/102
See application file for complete search history.

(56) References Cited

U.S. PATENT DOCUMENTS

| | | | |
|---|---|---|---|
| 8,806,115 B1* | 8/2014 | Patel ................... | G06F 11/1471 711/103 |
| 2004/0078623 A1* | 4/2004 | Totolos, Jr. ......... | G06F 11/2015 714/6.2 |
| 2010/0191896 A1* | 7/2010 | Yang .................... | G06F 12/0246 711/103 |
| 2011/0191522 A1* | 8/2011 | Condict ............... | G06F 12/123 711/103 |
| 2011/0258391 A1* | 10/2011 | Atkisson ............. | G06F 12/0804 711/118 |
| 2012/0198174 A1* | 8/2012 | Nellans ............... | G06F 12/0804 711/133 |
| 2012/0221774 A1* | 8/2012 | Atkisson ............. | G06F 12/0802 711/103 |
| 2015/0193156 A1* | 7/2015 | Patel ................... | G06F 11/1471 711/103 |

* cited by examiner

*Primary Examiner* — Prasith Thammavong

(57) ABSTRACT

In aspects of a backup-power-free cache memory system, a cache controller implements a cache controller manager to provide nonvolatile storage for a computer system, without a backup power source to make the cache memory nonvolatile. Data to be stored in a storage media in the backup-power-free cache memory system is logged in the backup-power-free cache memory system in a circular queue with the tail stored in nonvolatile random access memory and the head of the queue stored in solid-state flash memory.

20 Claims, 8 Drawing Sheets

BACKUP-POWER-FREE CACHE MEMORY SYSTEM

RELATED APPLICATION

This application claims priority to U.S. Provisional Application No. 61/838,018 filed Jun. 21, 2013, the disclosure of which is incorporated herein by reference.

BACKGROUND

A potential performance bottleneck for a computer system can occur when a processor reads data from, or writes data to, storage media, such as a hard disk drive. Placing a cache memory system between the processor and the storage media decouples the processor from the slower access speeds of the storage media, which reduces this performance bottleneck. The cache memory system operates at the processor's memory bus speed and stores substantial amounts of data at higher speed until the data can subsequently be written to the storage media by the cache memory system at the slower access speeds. Consequently, the cache memory system requires a substantial amount of nonvolatile memory. Typically, this nonvolatile memory is implemented using volatile dynamic random access memory (DRAM) with some form of backup power, such as a backup battery unit or a hold-up capacitor, to prevent data loss.

SUMMARY

This Summary introduces concepts of a backup-power-free cache memory system, which are further described below in the Detailed Description and shown in the figures. Accordingly, this Summary should not be considered to describe essential features nor used to limit the scope of the claimed subject matter.

In general, in one aspect, this application discloses a backup-power-free cache memory system that includes a nonvolatile random access memory (NVRAM) configured as a first cache memory, multiple solid-state drive (SSD) memory devices configured as a second cache memory, a cache controller for communication with the cache memories, and a storage media. The cache controller implements a cache controller manager that executes instructions to support operations of the backup-power-free cache memory system. The cache controller manager receives a request to write data to the storage media, creates a log entry for the data in a write log stored in the first cache memory, appends the created log entry to a tail of the write log, updates a log header for the write log in the first cache memory to include a reference to the created log entry, and sends an acknowledgement that the write operation is complete.

A method for the backup-power-free cache memory system is described for executing a cache controller manager with a processor system of a cache controller, where the cache controller manager executes instructions to support operations of the cache controller for processing requests from a processor to write data to, or read data from, a storage media. The method also includes determining that a log entry in a first cache memory is to be moved to a second cache memory, determining an offset from the last log entry in the second cache memory, creating a log entry to write to the second cache memory that contains the data being moved from the first cache memory, writing the created log entry to the second cache memory, and updating the log header to include a reference to the created log entry in the second cache memory.

A storage system for the backup-power-free cache memory system is described with a cache memory system communicatively coupled to a processor system and to a storage media. The cache memory system receives a request, which includes data to write to an address in the storage media, creates a log entry in a cache memory for the data in the request, appends the log entry to the tail of a write log in the cache memory, updates a log header in the cache memory, and sends an acknowledgement that the data has been written.

BRIEF DESCRIPTION OF THE DRAWINGS

Details of a backup-power-free cache memory system are described with reference to the following figures. The same numbers may be used throughout to reference like features and components that are shown in the figures.

DETAILED DESCRIPTION

Figure 1A:
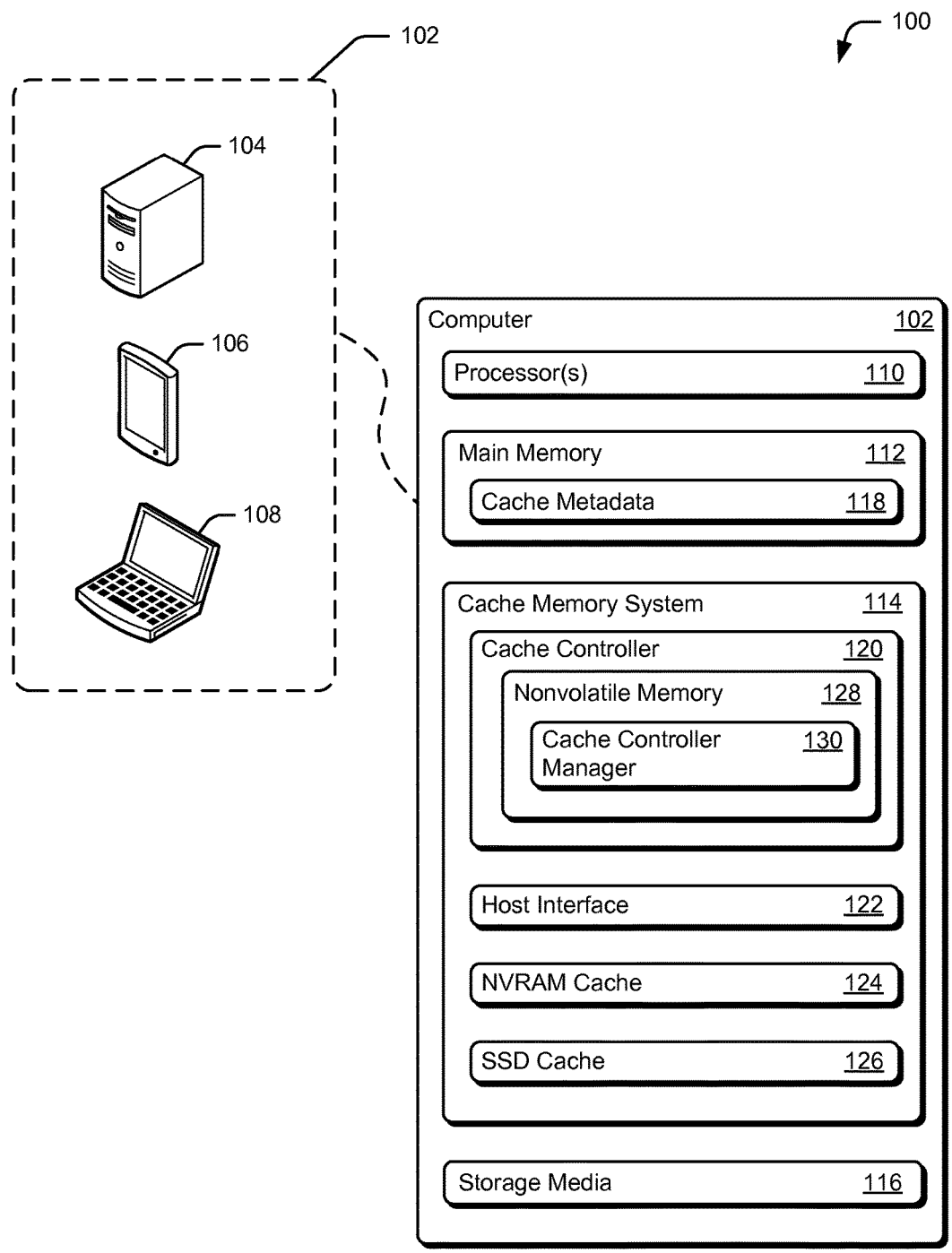
FIG. 1a illustrates an example computer system in which aspects of a backup-power-free cache memory system can be implemented.

Computer systems store data in storage media, such as files in a file system on a hard disk drive, which may become a performance bottleneck for a computer system due to inherently slower access speeds of the storage media. As the bus speeds of processors are higher and have lower latency than the access speeds and latencies of storage media, a cache memory system may be placed between a processor and the storage media to provide higher speed and lower latency read and write operations for the processor. Data being written by the processor may be written as a log entry in the cache memory system where the data resides until it is synchronized with the storage media. Additionally, frequently read data may be loaded into a read cache in the cache memory system to provide faster access to frequently read data.

Cache memory systems require the presence of a nonvolatile memory of substantial size to ensure low latency write operations. This nonvolatile memory may be nonvolatile random access memory (NVRAM), which is typically implemented using standard, volatile dynamic RAM (DRAM) that is made nonvolatile using backup power. The backup power is typically provided by a battery backup unit or a hold-up capacitor, such as a super-capacitor. The use of a battery backup or a hold-up capacitor adds undesirable cost and weight to the cache memory system, and consumes extra space on the circuit board of the cache memory system.

The advent of nonvolatile memory technology, such as magnetoresistive random access memory (MVRAM) or phase change random access memory (PCRAM), makes it possible to design a cache memory system that does not require a source of backup power. Unfortunately, these types of nonvolatile random access memory are quite expensive. Therefore, it is desirable to design a cache memory system that uses a small amount of nonvolatile RAM and is still able to deliver the low latency and throughput desired in a cache memory system.

In a conventional cache memory system that uses DRAM with a backup power supply, data is written by the processor to the cache memory system, the data is then asynchronously written to the storage media, and finally is flushed from the cache memory system after writing the data to the storage media. Typically, some flash memory is included in these conventional cache memory systems so that, on power failure or power-down, the contents of the DRAM are written to the flash memory to render the data in the cache memory system nonvolatile during the power outage.

In one example, NVRAM is used for a first cache memory because it is inherently nonvolatile and does not require the flash memory to maintain the cached data during power outages. Write operations can be immediately acknowledged to the application running on the processor once data is written to the NVRAM cache. Because the NVRAM for the first cache memory is small to reduce the cost of the cache memory system, the cache memory system is designed with a combination of NVRAM and SSD memory. Data written to the cache is first written to the NVRAM cache and then is continuously moved into a second cache memory (e.g., an SSD cache). By coupling these two types of memory together in the cache memory system, a large, low latency, nonvolatile cache memory system is created at low cost. Entries in the second cache memory are then further moved by the cache controller to the storage media.

While features and concepts of a backup-power-free cache memory system can be implemented in any number of different devices, systems, environments, and/or configurations, aspects of a backup-power-free cache memory system are described in the context of the following example devices, systems, and methods.

FIG. 1a illustrates an example system 100 in which aspects of a backup-power-free cache memory system can be implemented. The example system includes computer 102, which may be any one of various types of computer systems, such as server 104, mobile device 106, or personal computer 108. Computer 102 includes one or more processors 110, main memory 112, cache memory system 114, and storage media 116. Processors 110 are capable of executing various programs, including those shown in main memory 112. Main memory 112 may include various kinds of volatile and non-volatile media, such as random access memory, flash memory, or hard disk drives. Cache memory system 114 may also be separate from, but accessible by, computer 102, such as when operating as or including a wired, external storage system. Main memory 112 is shown including cache metadata 118, which maintains mappings of logical block addresses to locations in cache memory system 114.

Cache memory system 114 is configured to provide non-volatile storage using cache controller 120, which includes, or has access to, host interface 122 and storage media 116. Storage media 116 includes spinning media, such as magnetic or optical disks, and/or SSD storage. Cache memory system 114 includes cache controller 120, NVRAM cache 124, and SSD cache 126. Cache controller manager 130, such as a software application (e.g., computer-executable instructions), can be stored in nonvolatile memory 128 and can be executed by a processor (not shown), to implement aspects of a backup-power-free cache memory system as described herein. Generally, cache controller manager 130 may be implemented and/or described in the general context of software, firmware, hardware (e.g., fixed logic circuitry), applications, modules, or any combination thereof. In some implementations, cache controller 120 and other components may be implemented as a System-on-Chip (SoC) in cache memory system 114, such as described with reference to an example SoC shown in FIG. 7.

Figure 1B:
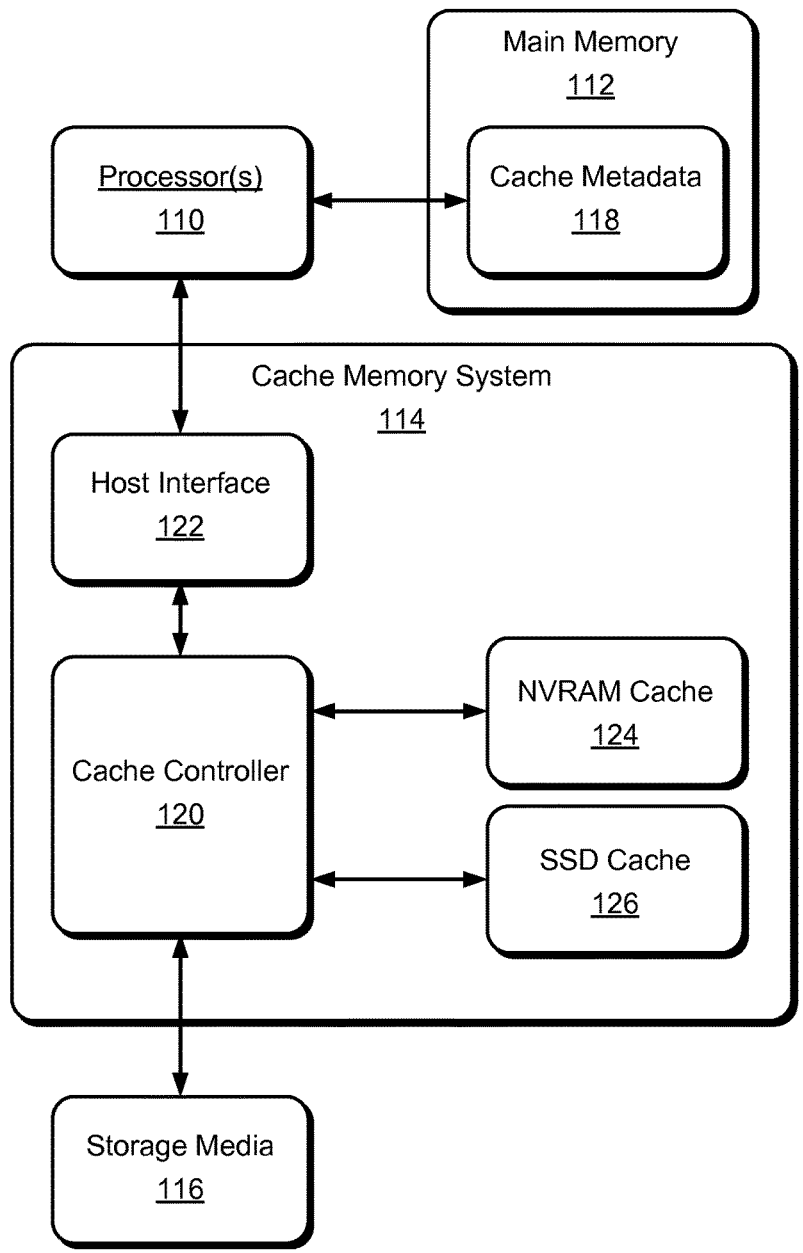
FIG. 1b illustrates an example block diagram of components of a computer system in which aspects of a backup-power-free cache memory system can be implemented.

FIG. 1b is a block diagram illustrating the relationships of various components in which aspects of a backup-power-free cache memory system can be implemented in computer 102. Processors 110 are connected to main memory 112 to access cache metadata 118. Additionally, processors 110 are connected through host controller 122, and in turn through cache controller 120, to NVRAM cache 124, SSD cache 126, and storage media 116.

The data written to the cache memory system is written in the form of log entries in a write log, which are maintained in a circular queue. The tail of the queue is composed of the most recent log entries written by processors 110 to cache memory system 114, and the head of the queue is maintained in SSD cache 126. References to the log entries are stored in a log header, which is maintained in NVRAM cache 124, and includes references to all log entries of the write log maintained in NVRAM 124 and SSD cache 126. Each time a new log entry is written to the write log, a corresponding reference is written to the log header. After the log entry and corresponding reference to the log header are written, an acknowledgment is provided to processors 110 to indicate that the data has been written.

Log entries include information describing the data, its location, and status indicators. For example, a log entry includes the data to write to storage media 116, along with the size of the entry, the location of the data in storage media 116, such as a starting logical block address, flags indicating the validity of the data, and a sequence number. The sequence number is used in the case when a particular block of data has been written to cache memory system 114 multiple times. The sequence number is used to determine which log entry of multiple log entries associated with a logical block address includes the most recently written data. This allows cache controller 120 to discard stale log entries so that only the most recent data is written to storage media 116.

The log header, maintained in NVRAM cache 124, maintains information relating to the write log, including the number and size of entries present in NVRAM cache 124, the number and size of entries present in SSD cache 126, a tail pointer to the last log entry in NVRAM cache 124, a head pointer to the first log entry in NVRAM cache 124, a head pointer to the first log entry in SSD cache 126, as well as any other information necessary to manage the write log. The log header information is updated each time a new log entry is added to the write log or each time a log entry is removed from the write log, such as when data is written to storage media 116.

The use of the circular log queue for the write log, and particularly placing the tail of the circular log in NVRAM cache 124, assures that cache memory system 114 can sustain large write I/O bursts from processors 110. This guarantees that the tail of the queue, where log entries are added, provides low latency performance.

In addition to improving write I/O performance, cache memory system 114 may also be used to cache data that is frequently read from storage media 116. In this case, the data is read from storage media 116 and put into a portion of SSD cache 126, where it can be read more quickly by processors 110.

In main memory 112 of computer 102, cache metadata 118 is maintained in a lookup table, which maintains a mapping of logical block addresses to the contents of the cache memory system, including the data currently in the write log, as well as the data in the read cache portion of SSD cache 126. As data is moved from NVRAM cache 124 to SSD cache 126, or from SSD cache 126 to storage media 116, the entries in the lookup table are modified so that processors 110 can find the desired data regardless of whether it is in cache memory system 114 or in storage media 116 by using the mapping of the logical block addresses in the lookup table.

Cache memory system 114 may also perform other operations. When processors 110 write data to cache memory system 114, cache memory system 114 creates a log entry including the data, appends the log entry to the tail of the write log, and updates the log header to indicate the new location in the write log. Cache memory system 114 updates the lookup table in main memory 112 to create a mapping entry for the logical block address and range of I/O of the data to the newly created log entry, and acknowledges the write operation to processors 110.

Cache memory system 114 determines if a copy of data to be read is stored in cache memory system 114 by intercepting a read operation intended for storage media 116. Cache memory system 114 checks the lookup table to determine if a mapping entry is present for the logical block address associated with the read operation. If a mapping entry exists, cache memory system 114 reads the data from cache memory based on the mapping entry, instead of reading the data from storage media 116.

The NVRAM flush operation detects when the tail of the write log in NVRAM cache 124 has exceeded a threshold. The threshold may be related to the number of log entries in NVRAM cache 124, the size of the data logged in NVRAM cache 124, the age of an entry in NVRAM cache 124, either as measured in time or by sequence numbers, or other attributes of the log entries in NVRAM cache 124. When the threshold is exceeded, log entries are moved from NVRAM cache 124 and are appended to the end of the portion of the write log in SSD cache 126. In order to ensure reliability in the event of an SSD device failure, log entries are written to a first SSD device and then replicated into an adjacent SSD device in SSD cache 126.

For each entry to be moved from NVRAM cache 124 to SSD cache 126, the log header is examined to determine the last location written in SSD cache 126 and the next offset where an entry can be written. A log entry header is created for this new location in SSD cache 126 and the data from the associated log entry in NVRAM cache 124 is appended to the created log header entry. This combination of the header and the NVRAM cache log entry is then written to an SSD device at the next offset entry and replicated in an adjacent SSD device in SSD cache 126. When the write completes, the log header in NVRAM cache 124 is updated to indicate the log entry is now in SSD cache 126, and the lookup table in main memory 112 is also updated with a mapping to the new location in SSD cache 126.

Cache memory system 114 periodically performs write log flush operations to flush data from SSD cache 126 to storage media 116. The write log flush operation proceeds by reading unique log entries from SSD cache 126, starting at the head of the write log, and writing the data in those log entries to the appropriate logical block address offsets in storage media 116, as indicated by the SSD log entry headers. The log header in NVRAM cache 124 includes the start offset and the end of the head of the write log for SSD cache 126 to allow the log flush operation to scan SSD cache 126 to find the next unique entry to synchronize to storage media 116. Each SSD log entry header also includes the size of the entry to enable write log flush operations to determine the beginning of the next entry. After data is synchronized to storage media 116, cache memory system 114 updates the lookup table with a mapping to indicate the data is no longer in cache memory system 114 and updates the log header in NVRAM cache 124 to indicate that the formally occupied space is now available for new log entries in SSD cache 126. Cache memory system 114 typically performs these flush operations continuously as a background operation but in a manner that does not delay the response of the cache memory system 114 to applications running on processors 110.

Since cache metadata 118 in main memory 112 is volatile, it is necessary to rebuild the lookup tables in cache metadata 118 when computer 102 restarts after a power failure. To do this, cache memory system 114 reads each write log entry in cache memory system 114, both in NVRAM cache 124 and SSD cache 126, to reconstruct the lookup tables in cache metadata 118 to correctly map logical block addresses to locations in cache memory system 114.

Cache memory system 114 performs the read cache operation to track frequently read data and to keep a copy of this data in a portion of SSD cache 126 used as a read cache for frequently read data. Once cache memory system 114 determines that one or more blocks of data on storage media 116 are being read frequently, those blocks of data are read from storage media 116 and stored in a location in SSD cache 126, and cache memory system 114 updates the lookup table of cache metadata 118 to correctly map reads for this data to SSD cache 126 instead of storage media 116. Cache memory system 114 may determine that data is frequently read in various ways, such as determining that a block of data is read more than a threshold number of times in a given period of time.

Figure 2:
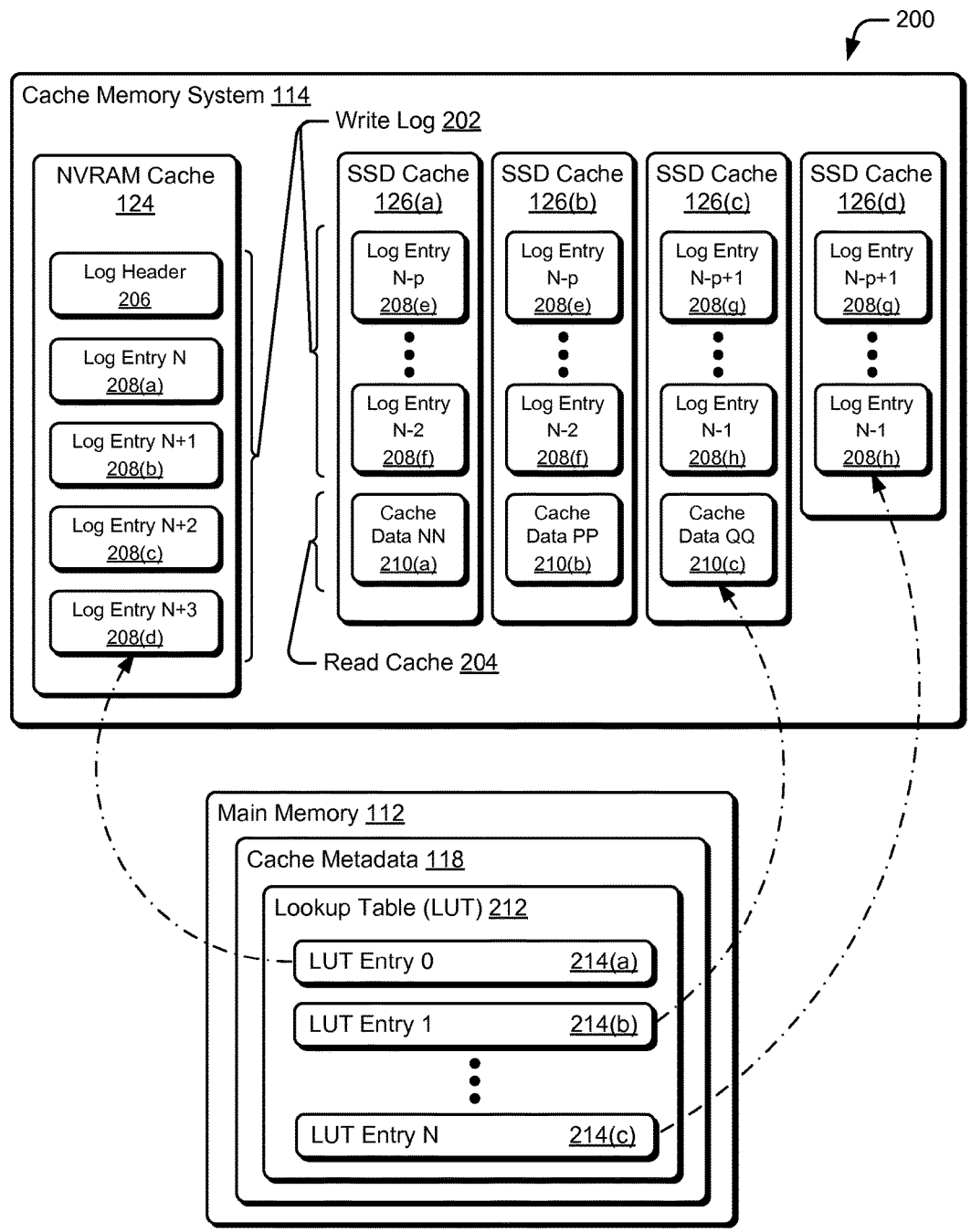
FIG. 2 illustrates the structure of, and relationships between, elements of an example cache memory system in which aspects of a backup-power-free cache memory system can be implemented.

FIG. 2 illustrates an example cache memory system 114 including NVRAM cache 124 and SSD cache 126 of a backup-power-free cache memory system as described herein. In this example system, details of write log 202 and read cache 204 are illustrated as they relate to log header 206, log entries 208, and cache data 210. SSD cache 126 is illustrated as 126(*a*)-126(*d*) to show the organization of SSD cache 126. SSD cache 126 may be used herein to collectively refer to one or more of SSD cache 126(*a*)-126(*d*). Multiple log entries 208 are illustrated as 208(*a*)-208(*h*) to show the various characteristics of write log 202. Log entry 208 may be used herein to collectively refer to one or more log entries 208, such as one or more of log entries 208(*a*)-208(*h*). As discussed above, log entries 208 are written to adjacent SSD devices to improve reliability in the event of a failure in a single SSD device. This replication is illustrated in FIG. 2, where log entries 208 in SSD cache 126(a) are replicated in adjacent SSD cache 126(b) and log entries 208 in SSD cache 126(c) are replicated in adjacent SSD cache 126(d). Multiple blocks of cache data 210 are illustrated as 210(a)-210(c) to show the various characteristics of read cache 204. Cache data 210 may be used herein to collectively refer to one or more blocks of cache data 210, such as one or more of cache data 210(a)-210(c).

Write log 202 may be implemented as a circular queue, such as a producer-consumer queue, where new items are added to the tail of the queue by a producer and the oldest item in the queue is removed from the head of the queue by the consumer. In cache memory system 114, the tail of write log 202 is stored in NVRAM cache 124 and the head of write log 202 is stored in SSD cache 126. As write I/O operations are performed, a new log entry 208 is created and added to the tail of write log 202. As illustrated in FIG. 2, the newest log entry at the tail of write log 202 is log entry 208(d), the next to newest log entry is 208(c), and so forth. The oldest log entry 208 in write log 202 is log entry 208(e) in SSD cache 126(a), which is replicated in SSD cache 126(b).

Read cache 204 includes a number of blocks of cache data 210, which are used to store frequently read blocks of data in cache memory system 114 to improve access time to read data, as compared to reading those blocks of data from storage media 116. Unlike write log 202, blocks of cache data 210 are not replicated into multiple SSD caches 126.

Main memory 112 includes cache metadata 118 which in turn includes lookup table 212. Lookup table 212 includes multiple lookup table entries 214. Multiple lookup table entries 214 are illustrated as 214(a)-214(c) to show the various characteristics of lookup table 212. Lookup table entry 214 may be used herein to collectively refer to one or more lookup table entries 214, such as one or more of lookup table entries 214(a)-214(c). Each lookup table entry 214 in lookup table 212 includes a mapping for logical block addresses of data in storage media 116 that maps the logical block address for the data to a log entry 208 or a cache data 210. For example, lookup table entry 214(a) maps a logical block address to log entry 208(d), as shown by a dot-dash line in FIG. 2. Lookup table entry 214(b) maps a logical block address to read cache 210(b), and lookup table entry 214(c) maps a logical block address to log entry 208(h), also as shown by dot-dash lines.

Example methods 300, 400, 500, and 600 are described with reference to respective FIGS. 3, 4, 5, and 6 in accordance with one or more aspects of a backup-power-free cache memory system. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
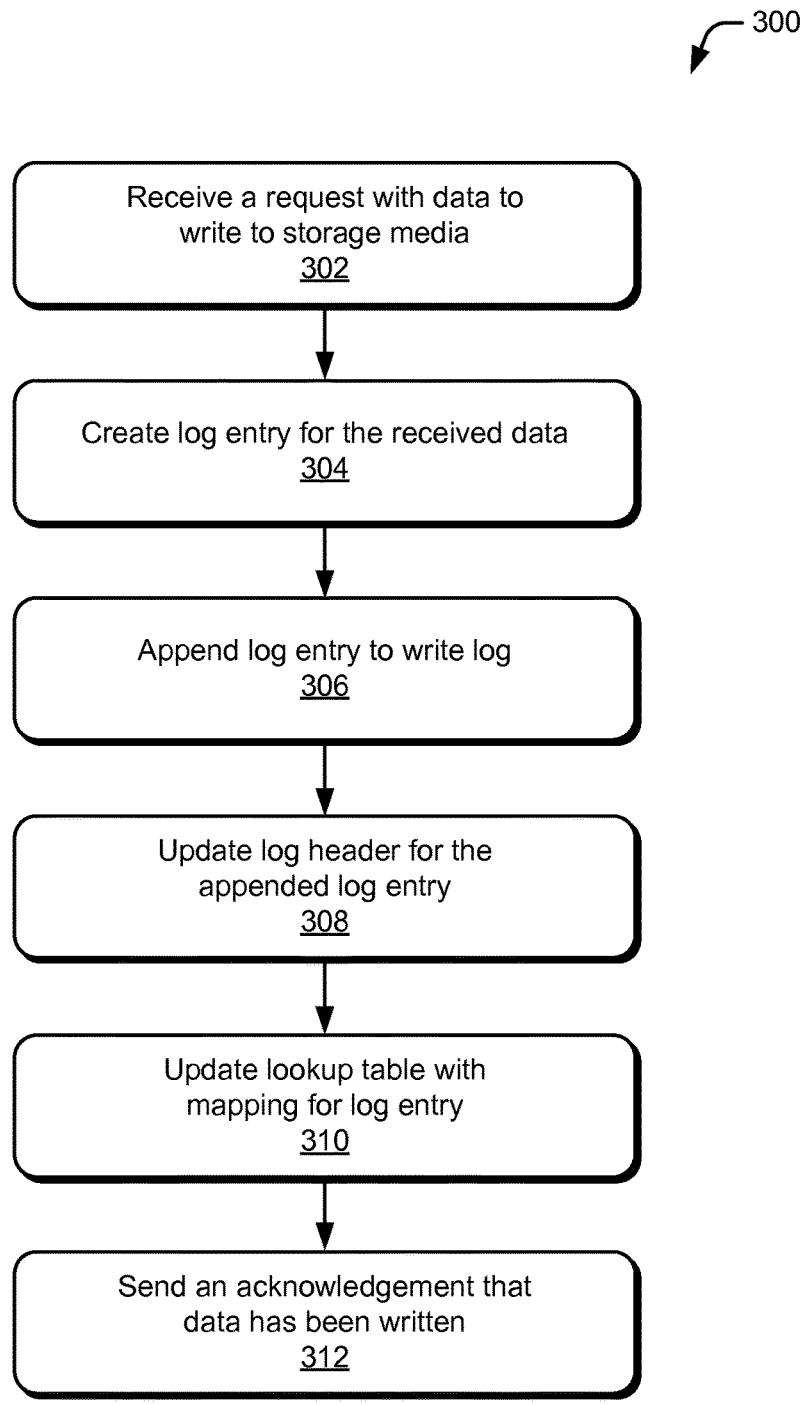
FIG. 3 is a flow diagram that depicts an example procedure in which a cache memory system of a backup-power-free cache memory system receives and stores data in a log of a cache memory.

FIG. 3 illustrates example method 300 of a backup-power-free cache memory system, and is described with reference to cache controller 120. The orders in which this method and other methods described herein are described is not intended to be construed as a limitation, and any number of the described methods' operations can be combined in any order to implement the method, or an alternate method.

At 302, a request, including data, is received by cache controller manager 130 from an application executing on processors 110 to write the data at a logical block address on storage media 116.

At 304, cache controller manager 130 creates a log entry 208, which includes the logical block address, the size of the data, and the data to write at the logical block address. At 306, cache controller manager 130 appends the created log entry 208 to a tail of write log 202 as indicated by a tail pointer in log header 206 in NVRAM cache 124.

At 308, cache controller manager 130 updates log header 206, based on appending created log entry 208 to the tail of write log 202, including updating a tail pointer to the tail of write log 202 to indicate the location of the created log entry 208 and incrementing a counter of the number of log entries 208 in NVRAM cache 124.

At 310, a lookup table entry 214, corresponding to the created log entry, is updated in lookup table 212 to create a mapping entry for the logical block address associated with the created log entry 208 including the logical block address and the address range of the stored data on storage media 116. The mapping in lookup table entry 214 indicates to processors 110 the location where the data is stored in NVRAM cache 124.

At 312, once the other operations are complete, cache controller manage 130 sends an acknowledgement to processors 110 indicating that the request to write data has been completed.

Figure 4:
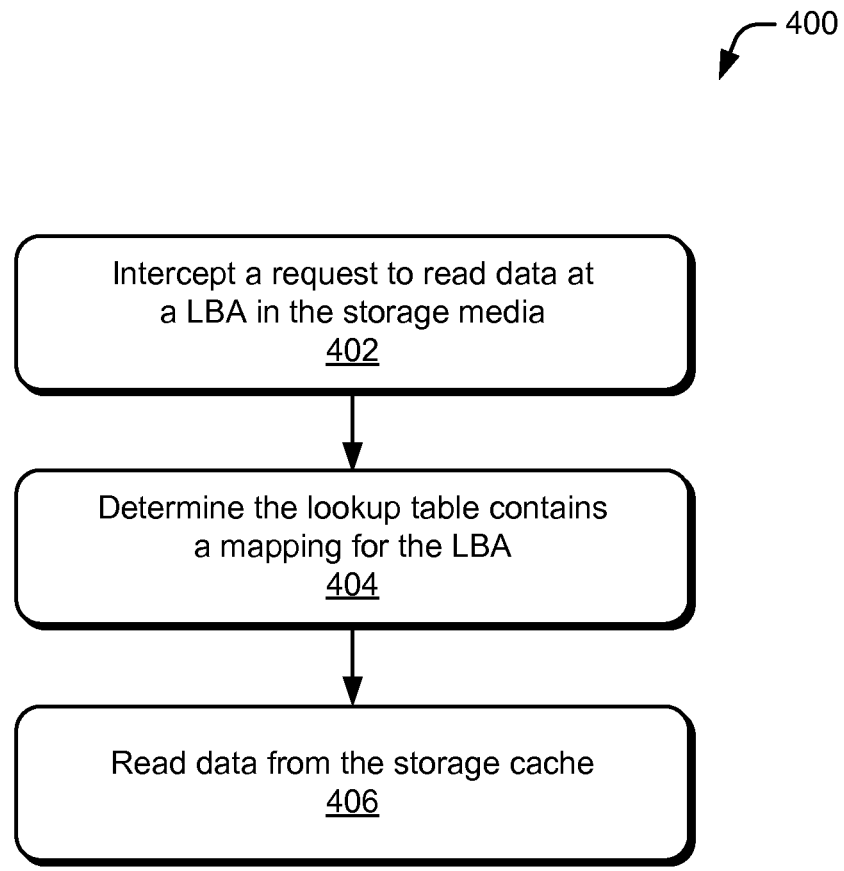
FIG. 4 is a flow diagram that depicts an example procedure in which a cache memory system of the backup-power-free cache memory system intercepts a read request for data at a Logical Block Address on a storage media and reads a copy of the requested data from a cache memory system.

FIG. 4 illustrates example method 400 of a backup-power-free cache memory system, and is described with reference to cache controller 120.

At 402, a request from processors 110 to read data at a logical block address in storage media 116 is intercepted by cache controller 120.

At 404, cache controller manager 130 accesses lookup table 212 to determine if there is a lookup table entry 214 that matches the logical block address included in the intercepted read request.

At 406, in response to finding a matching lookup table entry 214, cache controller manager 130 uses the mapping in lookup table entry 214 to read the requested data from a mapped location in cache memory system 114 that includes the cached copy of the requested data and returns that data to processors 110.

Figure 5:
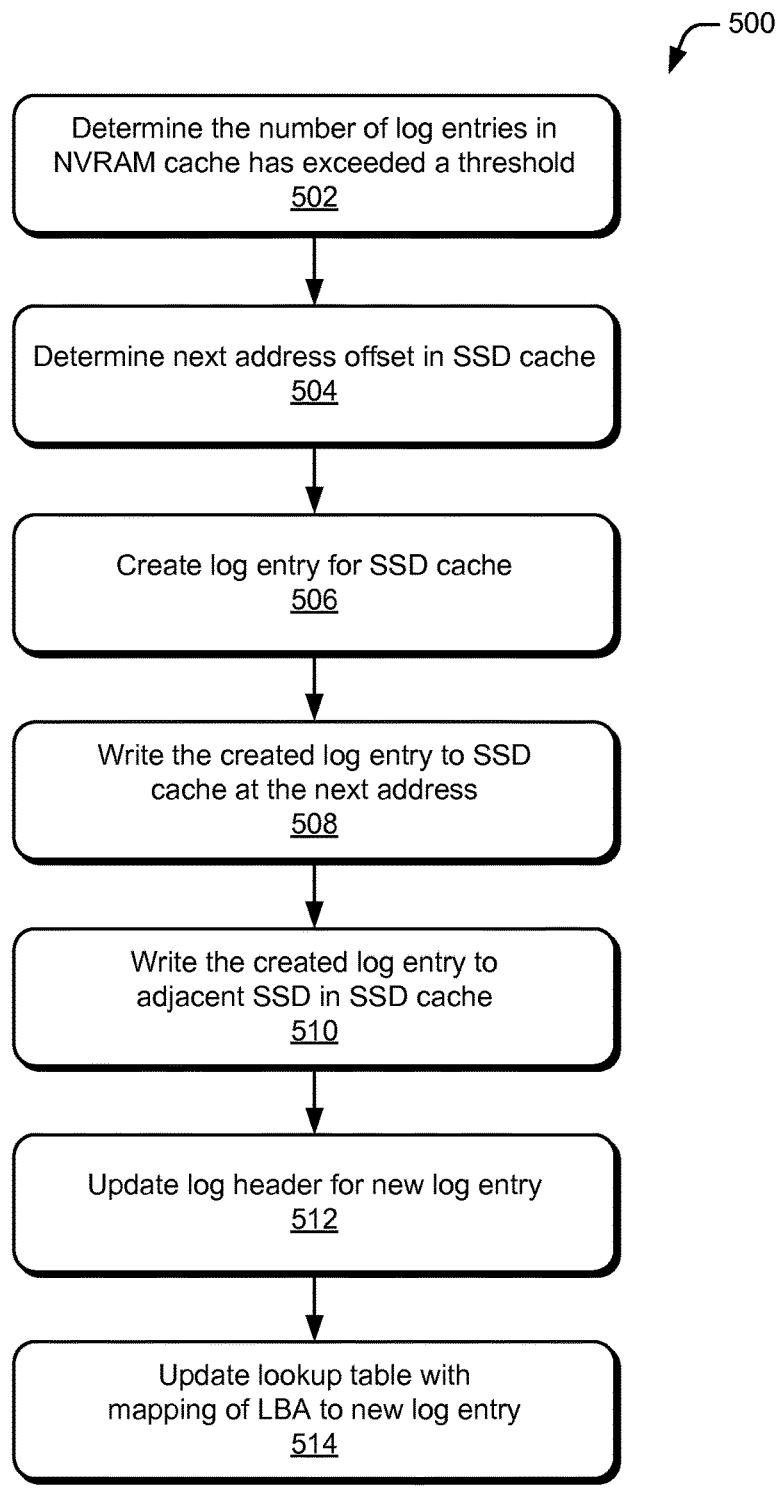
FIG. 5 is a flow diagram that depicts an example procedure in which a cache memory system of a backup-power-free cache memory system flushes data from a first cache memory to a second cache memory.

FIG. 5 illustrates example method 500 of a backup-power-free cache memory system, and is described with reference to cache controller 120.

At 502, cache controller manager 130 determines that the number of log entries 208 stored in NVRAM cache 124 of cache memory system 114 has exceeded a threshold.

At 504, cache controller manager 130 reads log header 206 to determine the next address offset in SSD cache 126. At 506, cache controller manager 130 creates a new log entry 208 that includes an SSD log entry header and the data from oldest log entry 208 in NVRAM cache 124.

At 508, cache controller manager 130 writes new log entry 208 to SSD cache 126 at the address offset determined at 504. At 510, cache controller 130 writes new log entry 208 to an adjacent SSD cache 126, to provide a redundant copy of new log entry 208.

At 512, cache controller manage 130 updates log header 206, to reflect the addition of new log entry 208 to SSD cache 126 and the deletion of oldest log entry 208 from NVRAM cache 124.

At 514, cache controller manager 130 updates the mapping in a lookup table entry 214, corresponding to oldest log entry 208, to map the logical block address in lookup table entry 214 to the address of new log entry 208 in SSD cache 126.

Figure 6:
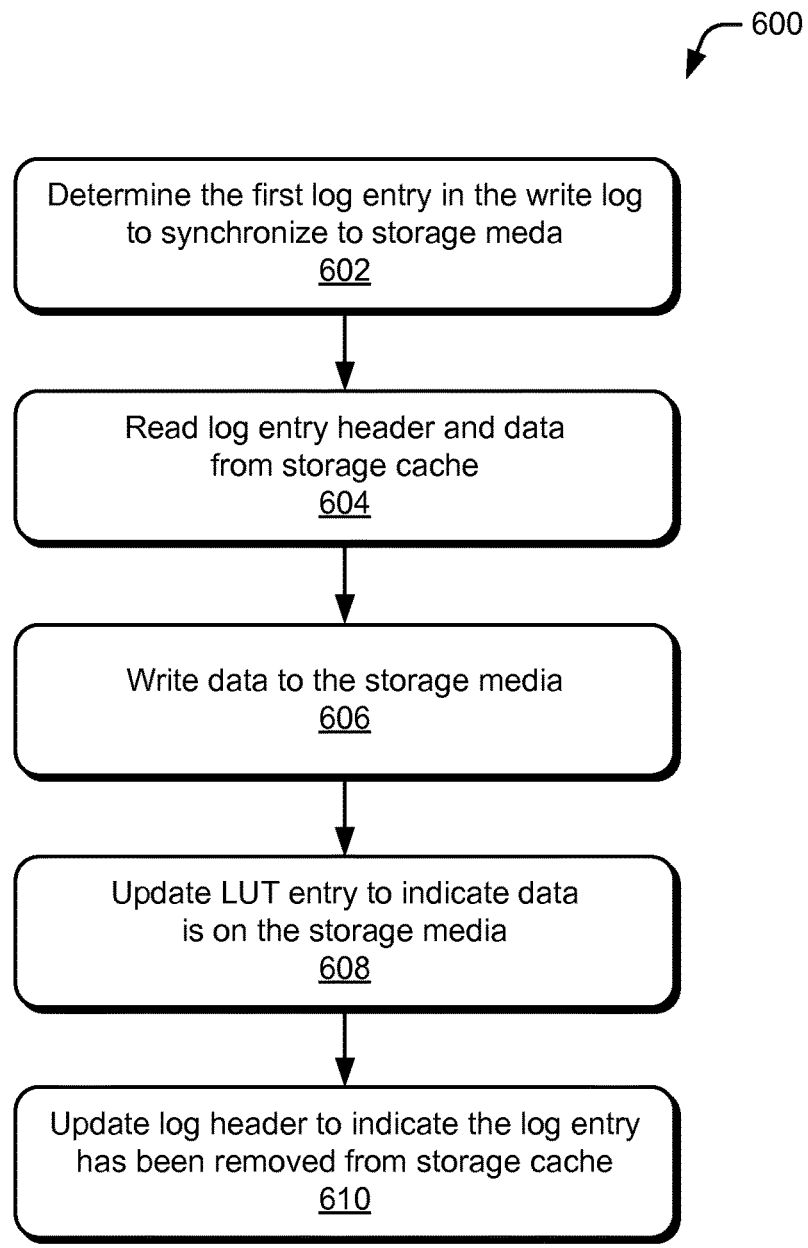
FIG. 6 is a flow diagram that depicts an example procedure in which a cache memory system of a backup-power-free cache memory system synchronizes data from cache memory to a storage media.

FIG. 6 illustrates example method 600 of a backup-power-free cache memory system, and is described with reference to cache controller 120.

At 602, cache controller manager 130 periodically synchronizes log entries 208 in SSD cache 126 to storage media 116 by determining first log entry 208 in SSD cache 126, which will be synchronized to storage media 116. Typically the first log entry to be synchronized is the oldest log entry, but other criteria, such as size of the log entries or other parameters may be used to determine which log entry to synchronize.

At 604, cache controller manager 130 reads log entry 208, determined at 602, and using information in the header of determined log entry 208, cache controller manager 130 determines the logical block address in storage media 116 where data in log entry 208, determined at 602, will be written.

At 606, cache controller manager 130 writes the data from the determined log entry 208 at the logical block address, determined in 604, in storage media 116.

At 608, cache controller manager 130 updates the mapping in a lookup table entry 214 corresponding to determined log entry 208 to map the logical block address in lookup table entry 214 to the logical block address in storage media 116 where determined log entry 208 was written.

At 610, cache controller manager 130 updates log header 206, to reflect the removal of determined log entry 208 from SSD cache 126.

Figure 7:
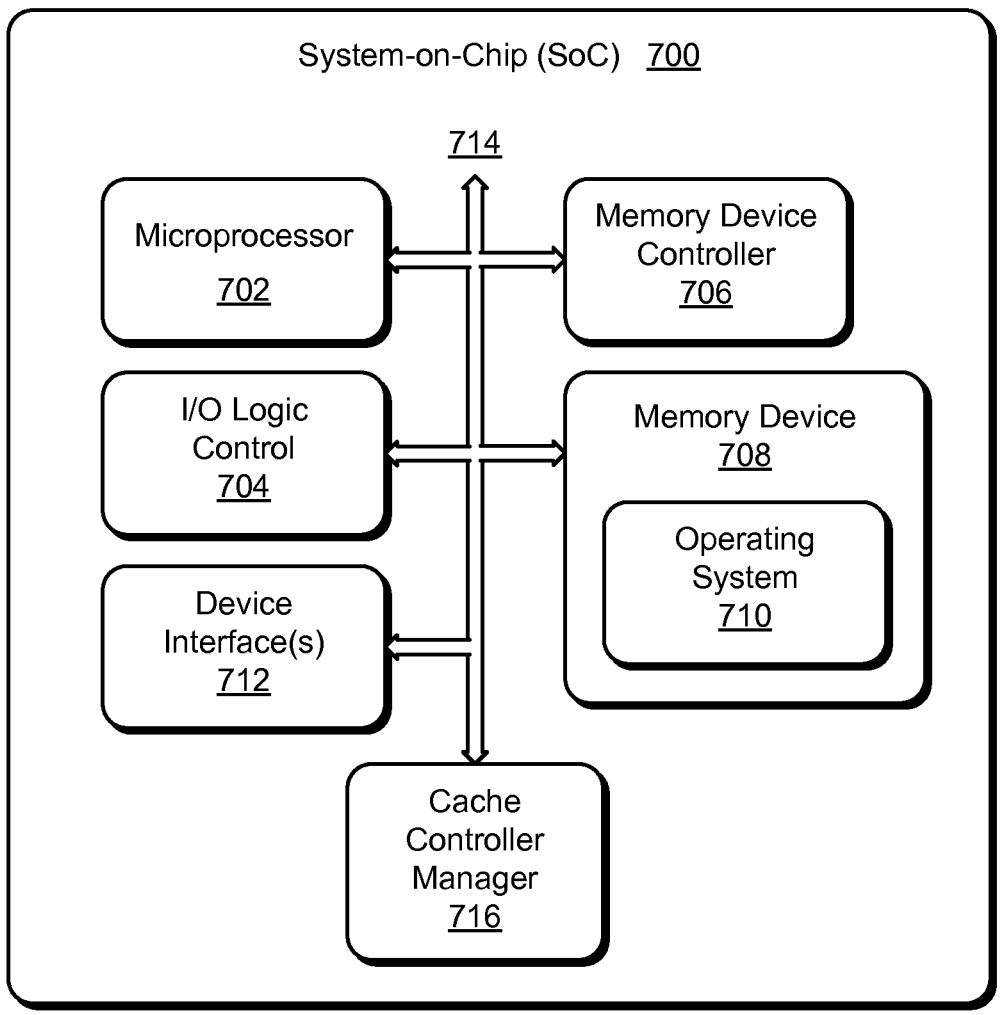
FIG. 7 illustrates an example System-on-Chip (SoC) environment in which aspects of a backup-power-free cache memory system can be implemented.

FIG. 7 illustrates an example System-on-Chip (SoC) 700, which can implement various aspects of a backup-power-free cache memory system as described herein. A SoC can be implemented in any suitable computing device, such as a video game console, IP enabled television, desktop computer, laptop computer, tablet computer, server, network-enabled printer, set-top box, storage array, network attached storage, and/or any other type of device that may employ media drives for data storage.

In this example, SoC 700 is integrated with a microprocessor 702 (e.g., any of a microcontroller or digital signal processor) and input-output (I/O) logic control 704 (e.g., to include electronic circuitry). SoC 700 includes a memory device controller 706 and a memory device 708, such as any type of a nonvolatile memory and/or other suitable electronic data storage device. The SoC can also include various firmware and/or software, such as an operating system 710 that is maintained by the memory and executed by the microprocessor.

SoC 700 includes a device interface 712 to interface with a device or other peripheral component, such as when installed in storage controller 120 as described herein. SoC 700 also includes an integrated data bus 714 that couples the various components of the SoC for data communication between the components. The data bus in the SoC may also be implemented as any one or a combination of different bus structures and/or bus architectures.

In aspects of a backup-power-free cache memory system, SoC 700 includes a storage controller manager 716 that can be implemented as computer-executable instructions maintained by memory device 708 and executed by microprocessor 702. Alternatively, storage controller manager 716 can be implemented as hardware, in firmware, fixed logic circuitry, or any combination thereof that is implemented in connection with I/O logic control 704 and/or other processing and control circuits of SoC 700. Examples of storage controller manager 716, as well as corresponding functionality and features, are described with reference to storage controller manager 130 shown in FIG. 1.

Although aspects of a backup-power-free cache memory system have been described in language specific to features and/or methods, the subject of the appended claims is not necessarily limited to the specific features or methods described. Rather the specific features and methods are disclosed as example implementations of a backup-power-free cache memory system.

What is claimed is:

1. A cache memory system, comprising:
a nonvolatile random access memory configured as a first cache memory to store one or more log entries for data to write to a storage media;
a plurality of solid-state memory devices (SSD) configured as a second cache memory to store the one or more log entries for the data to write to the storage media;
a lookup table comprising a mapping of logical block addresses to the one or more log entries of the first cache memory and the second cache memory;
memory configured to maintain instructions for operations of a cache controller manager;
a processor to implement the instructions for the cache controller manager, the cache controller manager configured to:
receive a request to write the data to an address in the storage media;
create a first log entry in the first cache memory, the first log entry comprising the address in the storage media, a size of the data, and the data to write to the storage media;
append the created first log entry to a tail of a write log in the first cache memory;
update a log header for the write log in the first cache memory to include a reference to the created first log entry;
create a mapping of the received address, in the lookup table, to the created first log entry in the first cache memory;
send an acknowledgement that the request to write data is complete;
in response to exceeding a threshold related to a number of log entries in the first cache memory, create a second log entry to store in the second cache memory, the second log entry comprising the data in the first log entry;
write the created second log entry to a first SSD in the second cache memory;
update the log header in the first cache memory to include a reference to the second log entry in the second cache memory; and
update the mapping of the received address in the lookup table to map to the second log entry in the second cache memory.

2. The cache memory system of claim 1, wherein the write log includes multiple log entries stored as a circular queue, a tail of the circular queue being stored in the first cache memory and a head of the circular queue being stored in the second cache memory.

3. The cache memory system of claim 1, wherein the cache controller manager is further configured to:
   move the data in the second log entry from the second cache memory to the storage media.

4. The cache memory system of claim 1, wherein the cache controller manager is further configured to:
   write the created second log entry to a second SSD in the second cache memory, the second SSD being adjacent to the first SSD.

5. The cache memory system of claim 1, wherein the nonvolatile random access memory is one of a magnetoresistive random access memory (MRAM) or a phase change random access memory (PCRAM).

6. A method, comprising:
   determining that a log entry in a write log of a cache memory system is to be moved from a first cache memory to a second cache memory;
   determining an offset from a last log entry of the write log in the second cache memory;
   creating a new log entry to write to the second cache memory, the created log entry comprising data in the log entry being moved;
   writing the created log entry to the second cache memory at the determined offset;
   updating a log header in the write log to include a reference to the created log entry in the second cache memory;
   writing a mapping of a logical block address associated with the log entry, in a lookup table, to map the logical block address for the data stored in a storage media to the created log entry in the second cache memory.

7. The method of claim 6, wherein writing the created log entry to the second cache memory at the determined offset comprises:
   writing the created log entry to a first solid-state memory device (SSD) in the second cache memory at the determined offset; and
   writing the created log entry to a second SSD in the second cache memory at the determined offset.

8. The method of claim 6, further comprising:
   moving the data in the created log entry from the second cache memory to the storage media.

9. The method of claim 6, wherein the first cache memory is a nonvolatile random access memory.

10. The method of claim 9, wherein the nonvolatile random access memory is one of a magnetoresistive random access memory (MRAM) or a phase change random access memory (PCRAM).

11. The method of claim 6, wherein the write log includes multiple log entries stored as a circular queue, a tail of the circular queue being stored in the first cache memory and a head of the circular queue being stored in the second cache memory.

12. The method of claim 11, wherein the references in the log header comprise entries describing a size and a number of log entries in the circular queue.

13. A system comprising:
   a processor system comprising a processor and memory;
   a storage media; and
   a cache memory system communicatively coupled to the processor system and to the storage media, the cache memory system configured to:
      receive a request to write data to an address in the storage media;
      create a log entry in a first cache memory of the cache memory system, the log entry comprising the address in the storage media, a size of the data, a sequence number, and the data to write to the storage media;
      append the created log entry to a tail of a write log in the first cache memory;
      update a log header in the first cache memory to include a reference to the created log entry;
      create a mapping of the received address, in a lookup table, to the created first log entry in the first cache memory;
      send an acknowledgement that the request to write data is complete;
      in response to exceeding a threshold related to a number of log entries in the first cache memory, create a second log entry to store in a second cache memory, the second log entry comprising the data in the first log entry;
      write the created second log entry to a first SSD in the second cache memory;
      update the log header in the first cache memory to include a reference to the second log entry in the second cache memory; and
      update the mapping of the received address in the lookup table to map to the second log entry in the second cache memory.

14. The system of claim 13, wherein the cache memory is a nonvolatile random access memory.

15. The system of claim 14, wherein the nonvolatile random access memory is one of a magnetoresistive random access memory (MRAM) or a phase change random access memory (PCRAM).

16. The system of claim 13, wherein the write log includes multiple log entries stored as a circular queue.

17. The system of claim 13, wherein the sequence number indicates the most recently written log entry corresponding to a specific address in the storage media.

18. The system of claim 16, wherein a tail of the circular queue is stored in the first cache memory and a head of the circular queue is stored in the second cache memory.

19. The system of claim 13, wherein the cache memory system is further configured to move the data in the second log entry from the second cache memory to the storage media.

20. The system of claim 13, wherein writing the created log entry to the second cache memory comprises:
   writing the created log entry to a first solid-state memory device (SSD) in the second cache memory; and
   writing the created log entry to a second SSD in the second cache memory.

* * * * *